United States Patent Office 2,719,155
Patented Sept. 27, 1955

2,719,155

NEW DIBENZOTHIOPHENE DIOXIDE DERIVATIVES AND PROCESS OF MAKING SAME

Adolf Emil Siegrist, Basel, Switzerland, assignor to Ciba Limited, Basel, Switzerland, a Swiss firm No Drawing. Application October 26, 1953,
Serial No. 388,447

Claims priority, application Switzerland October 31, 1952

16 Claims. (Cl. 260—249.6)

This invention provides new dibenzothiophene dioxide derivatives of the general formula

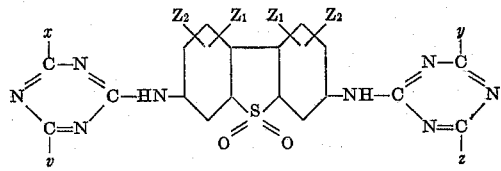

in which $x$ and $y$ each represent an —$NH_2$ group or the radical of a primary or secondary amine of which the nitrogen atom is bound to the triazine ring or an organic radical bound through an —O— or —S— bridge to the carbon atom of the triazine ring, $v$ and $w$ each represent a halogen atom or a hydroxyl group or a radical of the kind represented by $x$ or $y$, and $Z_1$ and $Z_2$ each represent a hydrogen or halogen atom or an alkyl, alkoxy or sulfonic acid radical, and in which none of the substituents $v$, $w$, $x$ or $y$ contains a group imparting color.

In this specification the positions in the dibenzothiophene dioxide nucleus designated in accordance with the Ring-Index, 1940, page 237, Number 1743, are as follows:

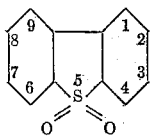

The compounds of the general formula first given above are insoluble or sparingly soluble in water, when none of the substituents, $v$, $w$, $x$, $y$, $Z_1$ or $Z_2$ contains one or more groups imparting solubility, for example, sulfonic acid groups. The new derivatives are colorless or at most feebly colored, and do not possess the character of dyestuffs in the narrow sense. Depending on their constitution they possess a more or less pronounced affinity for a very wide variety of substrata, for example, animal, vegetable or synthetic fibers. The compounds also possess a marked fluorescence, which is visible under irradiation with ultraviolet light either in solution or when the compounds are applied to a substratum. The color of the fluorescence varies depending on the constitution of the compounds and ranges from violet-blue to yellow-green. In the case of those products which exhibit a violet-blue to green-blue fluorescence, they can be used as optical brightening agents, because owing to the color of their fluorescence they enhance the white content of undyed materials or the purity of color of dyed materials. The compounds which exhibit fluorescence of another color can be used for producing other optical effects.

The invention also includes a process for making the compounds of the general formula first mentioned above, wherein (a) 1 mol of a benzidine derivative of the general formula

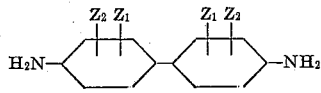

(b) an agent yielding $SO_3$, (c) 2 mols of cyanuric chloride, and (d) 2–4 mols of ammonia or 2–4 mols of a primary or secondary amine or 2–4 mols of a hydroxyl or mercapto compond or 2 mols of a compound capable of replacing the chlorine atoms in cyanuric chloride by hydroxyl groups, are reacted together in a suitable order of succession.

As starting materials of the general formula given under (a) above there come into consideration benzidine and benzidines which are alkylated, alkoxylated or halogenated in the benzene nucleus, for example, tolidine, and also benzidine disulfonic acid-(2:2′).

As agents yielding $SO_3$ there may be used above all sulfuric acid which contains sulfur trioxide dissolved therein, that is to say, oleum of various strengths. There also come into consideration solutions of sulfur trioxide in organic solvents, for example, methylene chloride.

Among the hydroxyl and mercapto compounds used as starting materials, which are reacted with the chlorine atoms of the cyanuric chloride and of which the radicals are represented by the substituents $v$, $w$, $x$ and $y$ in the general formula first mentioned above, there come into consideration saturated, unsaturated, straight-chain or branch-chain alcohols and mercaptans of the aliphatic series containing, for example, 1–10 carbon atoms, which may contain, in addition to a hydroxyl or mercapto group, further substituents such as halogen atoms, carboxylic acid or sulfonic acid groups or polyalkylene glycol radicals. Especially suitable, however, are the lower members of this series containing 1–6 carbon atoms, such, for example, as methyl alcohol, ethyl alcohol, propyl alcohol, isopropyl alcohol, allyl alcohol, butyl alcohol, secondary butyl alcohol, tertiary butyl alcohol, hexyl alcohol, 2-ethyl-butanol, hydroxyethane sulfonic acid, allyl mercaptan, amyl mercaptan, thioglycollic acid or thioethylene glycol. The aromatic members of this class of compounds may be derived from any desired aromatic parent compounds, but above all from benzene or naphthalene. If desired, they may contain, in addition to a hydroxyl or mercapto group, further substituents such as halogen atoms, alkyl groups, etherified hydroxyl groups, acylated or dialkylated amino groups, and also carboxylic acid or sulfonic acid groups. There may be mentioned phenol, ortho-, meta- or para-chlorophenol, 2:4-dichlorophenol, ortho-, meta- or paracresol, halogenated cresols, para-bromophenols, naphthols, para-tertiary butyl-phenol, salicyclic acid, para-hydroxybenzoic acid, phenol sulfonic acids, thymol, guaiacol and also thiophenol and its substitution products. Among the araliphatic hydroxyl compounds there come into consideration above all benzyl alcohol and its nuclear substitution products, such as para-tolylcarbinol, and also tetrahydronaphthyl-carbinols, such as ar-tetrahydro-α- and ar-tetrahydro-β-naphthyl-carbinol or mixtures of these compounds.

As members of the heterocyclic series, there may be mentioned as starting materials 2-mercapto-thiazoline, 2-hydroxy-benzthiazole or 2-mercaptobenzthiazole.

As primary and secondary amines for use in the reaction of this invention there come into consideration aliphatic, aromatic, araliphatic or heterocyclic amines. As aliphatic amines there may be used with advantage alkylamines, dialkylamines, hydroxyalkylamines, bis-(hydroxyalkyl)-amines and N:N'-dialkyl-alkylene diamines. There may be used straight-chain or branch-chain saturated or unsaturated members of this group of compounds containing, for example, 1–18 carbon atoms. Especially suitable are those containing a carbon chain of 1–4 carbon atoms. There may be mentioned, for example, methylamine, ethylamine, propylamine, isopropylamine, butylamine, isobutylamine, allylamine, monoethanolamine, di-isobutylamine and N:N'-dimethylethylene diamine. However, there also come into consideration aliphatic amines substituted in the alkyl residue, such, for example as taurine.

The aromatic amines may be mono- or poly-nuclear and may, if desired, contain further substituents. There are advantageously used aniline and its nuclear substitution products such, for example, as ortho- or para-toluidine or various chloranilines, ortho- or para-anisidine and others. Naphthylamines, such as $\alpha$- or $\beta$-naphthylamine and nuclear substitution products thereof can also be used in the process of this invention. The heterocyclic amines used in the process may contain one or more heteroatoms. There may be mentioned piperidine, $\alpha$-pipecoline, morpholine, pyrrolidine, imidazole, benzimidazole, 2-aminothiazole, 5-aminotetrazole and tetrahydroquinoline.

As stated above, the invention includes water-soluble and water-insoluble products. Water-insoluble compounds can be made by treating a free unsulfonated benzidine base with oleum under conditions such that only ring closure to form dibenzothiophene dioxide takes place. That can be done by maintaining relatively low temperatures. Thus, by starting from benzidine itself there is obtained 3:7-diamino-dibenzothiophene dioxide-(5) of the formula

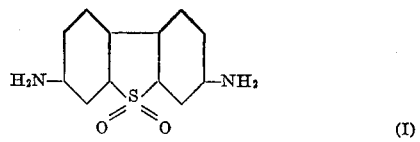

This intermediate product (I) (or an analogous product when another benzidine base is used as starting material) may be condensed with 2 mols of cyanuric chloride, which is advantageously carried out with the use of glacial acetic acid as solvent. In this manner there is obtained the intermediate product II of the formula

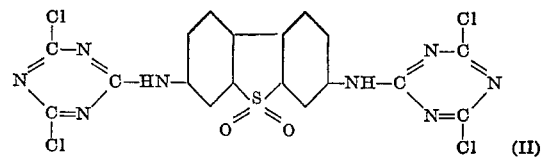

in which at least one chlorine atom in each of the two triazine rings is subsequently replaced by a hydroxyl group or reacted with a primary or secondary amine or a hydroxyl or mercapto compound.

The same compounds can be obtained by reacting 1 mol of the benzidine base first with 2 mols of cyanuric chloride, exchanging the remaining chlorine atoms and then bringing about ring closure by means of oleum. In this sequence of reactions the first two steps may be modified by starting from a cyanuric chloride derivative in which one or two of the chlorine atoms have already with aldehyde bisulfite addition products, for example, been replaced, and reacting this derivative with the benzidine base. The choice of the particular course of synthesis depends mainly on the stability of the intermediate products towards oleum. When compounds are to be made in which all the chlorine atoms of the triazine rings are replaced by amine radicals, ring closure to form the dibenzothiophene dioxide derivative can easily be carried out as the final step. When all or some of the substituents $v$, $w$, $x$ and $y$ in the triazine rings in the formula first mentioned above are radicals other than amine radicals, it is desirable in many cases first to prepare the above mentioned intermediate product I.

There are also various methods available for producing the water-soluble compounds. Water-solubility is advantageously imparted to the compounds of the invention by the introduction of sulfonic acid groups. The sulfonic acid groups may be introduced at various stages in the synthesis. Thus, for example, they may be introduced as a final step into the previously prepared water-insoluble dibenzo-thiophene dioxide derivatives, provided that the latter contain aromatic nuclei capable of being sulfonated. Such aromatic nuclei can easily be introduced into the molecule by exchanging the chlorine atoms in the triazine rings by the radicals of aromatic compounds, for example, aniline. The sulfonation may be carried out, for example, by treatment with oleum. By starting from the above mentioned intermediate product I the intermediate product II can be made, then the chlorine atoms may be exchanged, it being of advantage to exchange two chlorine atoms by the radicals of compounds containing an aromatic nucleus, for example, aniline. The sulfonation is then carried out. However, it is of advantage to combine the sulfonation of the aromatic nucleus with the ring closure to form the dibenzothiophene dioxide ring. Thus, by starting, for example, from benzidine, aniline and any other desired amine, there is first prepared the intermediate product III of the formula

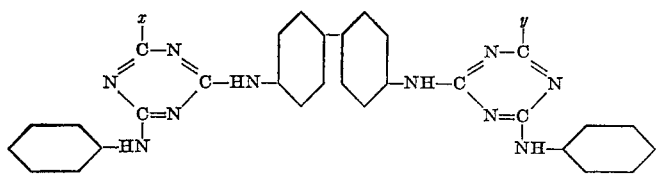

in which $x$ and $y$ represent the radical of a secondary or primary amine. By treating this intermediate product with oleum both of the aniline nuclei can be sulfonated and ring closure brought about simultaneously, so that an end product of the formula

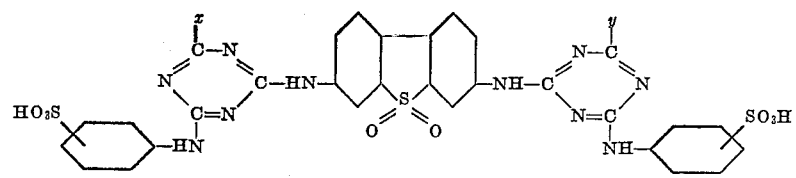

is obtained in one step.

Water-soluble compounds can also be made by choosing for replacement of the chlorine atoms in the triazine rings compounds which contain one or more groups imparting solubility, such as sulfanilic acid or taurine. It is also possible to introduced groups imparting solubility by starting from water-insoluble dibenzothiophene dioxide derivatives of the formula first mentioned above, in which at least one of the substitutents $v$, $w$, $x$ and $y$ represents a radical which still contains a reactive atomic grouping, for example, a primary or secondary amino group. Such amino groups may be reacted, for example, formaldehyde bisulfite, or with halogen-alkyl sulfonic acids or aralkyl-halogen-sulfonic acids, such as bromethane sulfonic acid or benzyl chloride sulfonic acid or with sultones such as butane sultone. Water-soluble compounds can also be made by so choosing the substituents $v$, $w$, $x$ and $y$ in the general formula first mentioned above, that a large number of atomic groupings favoring solubility in water is present. An atomic grouping favoring solubility in water is, for example, the hydroxyl group. The compound of the following formula, in which the substituents $v$, $w$, $x$ and $y$ represent the radicals of diethanolamine, is water-soluble:

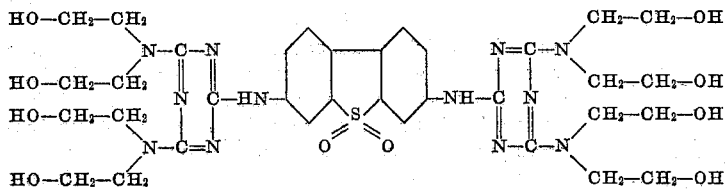

In the foregoing methods of introducing groups imparting solubility, these groups are introduced into the substituents in the triazine rings. However, compounds in which the groups imparting solubility in water are present in the dibenzothiophene dioxide ring system, may also be made. For this purpose it is of advantage to use as a starting material a benzidine base which is sulfonated in the 2:2'-positions, for example, benzidine disulfonic acid-(2:2'). This sulfonic acid is reacted with 2 mols of cyanuric chloride, at least one chlorine atom in each triazine ring is exchanged, and finally ring closure is brought about with oleum. In this case the stated sequence of reactions must be followed, because it has been found that benzidine disulfonic acid-(2:2') cannot be converted under the usual conditions by means of oleum into the corresponding 1:9-disulfo-3:7-diamino-dibenzothiophene dioxide-(5). 2:8-disulfo-3:7-diamino-dibenzothiophene dioxide-(5), which is obtainable from benzidine and oleum does not come into consideration as a starting material for making water-soluble compounds, in which the group imparting solubility is present in the dibenzothiophene dioxide ring system, and which correspond to the general formula first mentioned above, because the condensation of this body with cyanuric chloride can only be carried out with great difficulty and incompletely. With regard to the reaction conditions under which the individual reactions described above can be carried out, the following observations should be noted:

The condensation of the sulfonated benzidine bases with cyanuric chloride and the subsequent exchange of the chlorine atoms is carried out under conditions known for reactions of this kind. It is of advantage to work in the presence of water or a mixture of water with an organic solvent, such as acetone, and if desired in the presence of a buffer substance or an acid-binding agent, such as sodium acetate, an alkali carbonate or an alkali hydroxide. The reaction of the unsulfonated benzidine bases or the unsulfonated 3:7-diamino-dibenzothiophene dioxides-(5) with cyanuric chloride is advantageously conducted in the presence of glacial acetic acid, and this also applies to the subsequent replacement of the chlorine atoms. The conditions for carrying out the ring closure reaction and the sulfonation with oleum, when required, may vary very widely, and depend on the strength of the oleum and on the other substituents present. An oleum containing about 24 per cent. of $SO_3$ has been found advantageous. However, an oleum may be used containing a larger or smaller quantity of $SO_3$. With an oleum containing about 24 per cent. of $SO_3$ the reaction temperatures range from about 20 to 120° C. In most cases the ring closure can be carried out at a lower temperature than the subsequent sulfonation, when this is used. The reaction conditions required can easily be determined by a few preliminary tests. The fact that ring closure has taken place can be recognised, for example, by withdrawing a test portion which has been mixed with water and neutralized, pouring it on to paper, and noting whether it fluoresces strongly when exposed to ultraviolet light. The compounds which have not undergone ring closure fluoresce relatively feebly, whereas those which have undergone ring closure exhibit a very strong fluorescence, so that it is possible by observing the change in fluorescence to determine whether the reaction has occurred or not.

It is of advantage to prepare the water-soluble salts of the products containing sulfonic acid groups. As such salts there come into consideration those formed with ammonia or amines, but above all the alkali metal salts.

As stated above those compounds of the invention which exhibit a violet-blue to green-blue fluorescence are useful as optical brightening agents.

The brightening agents are used in the customary manner. Thus, the material to be improved may be impregnated with a solution, specially an aqueous solution, or a dispersion of the compond in question, and dried, after being centrifuged or squeezed. Products which contain acid groups are advantageously used in the form of aqueous solutions of their metal salts. Instead of using such aqueous solutions, there may be used solutions in organic solvents. Materials may also be treated with the compounds in dispersed form, for example, with dispersions which are prepared with dispersing agents such as soaps, soap-like substances, polyglycol ethers of fatty alcohols, sulfite cellulose waste liquor or condensation products of formaldehyde with naphthalene sulfonic acids, which may be alkylated.

The compounds used in accordance with the invention for brightening materials may also be applied to the materials in the course of their manufacture, by adding the compound, for example, to a paper pulp or a viscose solution, which is to be used for making films or threads, or to another spinning mass, for example, one prepared with a linear synthetic polyamide or a solution of acetyl cellulose intended for spinning. The compounds of the invention may also be added, for example, to liquors used for producing an anti-creasing dressing. They are also suitable for after-treating discharged prints. The new compounds, whether they be soluble or insoluble in water, may also be used together with washing agents. The washing agent and brightening agent may be added separately to the washing bath. It is also of advantage to use washing agents which contain an admixture of a brightening agent of the invention. As washing agents there are suitable for example, soaps, salts of sulfonated detergents such, for example, as sulfonated benzimidazoles containing as a substituent at the 2-carbon atom a higher alkyl radical, and also salts of monocarboxylic acid esters of 4-sulfophthalic acid with higher fatty alcohols, and furthermore salts of fatty alcohol sulfonates or condensation products of higher fatty acids with aliphatic hydroxy- or amino-sulfonic acids. There may also be used washing agents free from ions, for example, polyglycol ethers derived from ethylene oxide and higher fatty alcohols or alkyl phenols or fatty amines.

The invention also includes washing agents containing the brightening agents, and such washing agents may contain the additions usually incorporated with washing agents, such as alkali carbonates, phosphates, for example, primary or secondary alkali phosphates, pyrophosphates, polyphosphates, meta-phosphates, silicates, perborates or percarbonates. Washing agents may also be prepared which consist wholly or predominantly of inorganic compounds having a cleansing action and the brightening agents. The mixtures of washing agents and brightening agents can be carried out in a simple manner by mixing and/or grinding the components together. It may be of advantage to use one or other of the components in the dissolved or molten state in order to facilitate their distribution.

In general a small addition of the dibenzothiophene dioxide derivative to the washing agent suffices. There may be used, for example, preparations within the range of 0.1 to 5.0 per cent, calculated on the washing agent. Even smaller quantities, for example, 0.01 per cent. or less, may be added. Mixtures of the brightening agents of this invention with known brightening agents may also be used.

The washing agents of this invention can be used in the usual washing processes. In this manner materials to be cleaned are simultaneously washed and brightened.

The benzothiophene dioxide derivatives may be used alone as brightening agents, but they may be used together with known brightening agents. Especially suitable for joint use with other brightening agents are those compounds of the invention which exhibit a green-blue fluorescence, as they can be used for adjusting the shade, that is to say, by mixing them with compounds having a reddish blue fluorescence the combined color of the fluorescene is pure blue and the brightening effect has a neutral white appearance.

As materials which are to be improved in accordance with the invention, there may be mentioned for example: Natural or artificial nitrogenous materials, such as wool, silk or synthetic polyamide fibers; also cellulosic materials such as cellulose, paper, and textile materials of cotton, linen, regenerated cellulose, including artificial fibers of regenerated cellulose; and finally synthetic materials, for example, those produced by polymerization. The best effects however, are obtained in the present process on vegetable and animal fibers. The material to be improved may be in any desired form, for example, in the form of fibers or films. Furthermore, the material may be, for example, undyed, dyed or printed.

The following examples illustrate the invention, the parts being by weight unless otherwise stated, and the relationship of parts by weight to parts by volume being the same as that of the kilogram to the liter:

*Example 1*

Into 190 parts of oleum (24 per cent. SO₃) there are introduced in small portions, while cooling and stirring well, 20 parts of 4:4'-bis-[2:4-diethylamino-1:3:5-triazyl-(6)]-benzidine disulfonic acid-(2:2') of the formula

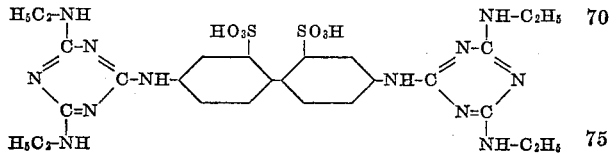

in such manner that the temperature does not rise above 30° C. The mixture is stirred for a further 20 minutes at 20-30° C., the temperature is increased to 65-70° C., and the whole is stirred for one hour at that temperature and finally for 3 hours at 85-90° C. After being cooled, the brown reaction mixture is poured on to 400 parts of ice, and then a further 250-350 parts of water are added to the resulting suspension. The suspension is cooled while stirring well at 5° C., sharply filtered with suction, and the filter residue is suspended in 1000 parts of hot water. The mixture is then rendered neutral with dilute sodium carbonate solution, whereby dissolution becomes complete. The resulting disodium salt of 1:9-disulfo - 3:7 - bis - [2:4 - diethylamino - 1:3:5 - triazyl-(6)]-diamino-dibenzothiophene dioxide-(5) of the formula

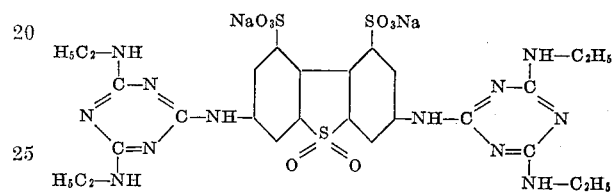

can be isolated from the aqueous solution by evaporation or salting out with sodium chloride. There is obtained a pale yellowish powder which is soluble in water. When the solution is poured on to white paper, the latter fluoresces greenish blue when exposed to ultraviolet rays.

The 4:4' - bis - [2:4 - diethylamino - 1:3:5 - triazyl - (6)]-benzidine disulfonic acid-(2:2') used as starting material may be prepared as follows:

A solution of 38 parts of cyanuric chloride in 200 parts of acetone is stirred in a mixture of 400 parts of ice and 200 parts of water, and a solution, rendered neutral with sodium carbonate, of 38.5 parts of benzidine disulfonic acid-(2:2') in 200 parts of water is introduced dropwise, while stirring, into the resulting suspension at 0-5° C. in the course of 10 minutes. There is then added dropwise to the resulting reaction mixture in the course of ½ hour a solution of 11.2 parts of sodium carbonate in 200 parts of water in such manner that the mixture is maintained neutral to weakly acid. The whole is then stirred for a further 30 minutes at 10° C., after which the reaction mixture no longer contains free amino groups. 63 parts of an aqueous solution of 71 per cent. strength of monoethanolamine are then added, the temperature is raised to 30-35° C. in the course of one hour, and stirred at that temperature for 3-4 hours. Then the temperature is raised in the course of one hour to 80-85° C. and the whole is stirred for 6 hours at that temperature. After cooling the mixture to room temperature, the resulting 4:4'-bis-[2:4-diethylamino-1:3:5-triazyl-(6)]-benzidine disulfonic acid-(2:2') is precipitated by the addition of dilute hydrochloric acid, and the precipitate is filtered off, washed with water until free from mineral acid and dried.

In the following table are given further compounds which can be obtained in the same manner. The columns headed "Condensation time" and "Condensation temperature," refer to the reaction with oleum.

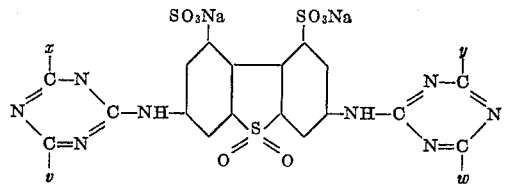

| x, y | v, w | Condensation time | Condensation temp., °C. | Color of fluorescence on paper |
|---|---|---|---|---|
| —NH—CH₃ | —NH—CH₃ | 60' / 120' | 65–70 / 85–90 | } blue-green. |
| —NH₂ | —NH—C₂H₅ | 60' / 150' | 65–70 / 80–90 | } Do. |
| —OH | —NH—C₂H₅ | 60' / 60' / 30' | 65–70 / 85–92 / 110–115 | } Do. |
| —N(C₂H₅)(C₂H₅) | —N(C₂H₅)(C₂H₅) | 120' / 180' | 65–90 / 105–110 | } greenish blue. |
| —N(CH₃)(CH₃) | —N(CH₃)(CH₃) | 30' / 120' | 65–70 / 80–85 | } Do. |
| —NH—C₂H₄OH | —NH—C₂H₄OH | 60' / 60' | 65–80 / 110–115 | } yellowish green. |
| —NH—C₂H₄OH | —N(CH₂CH₂)₂O | 60' / 60' | 75–80 / 105–110 | } Do. |
| —NH—CH₃ | —N(CH₂CH₂)₂O | 60' / 60' | 75–80 / 80–85 | } Do. |
| —N(CH₃)(CH₃) | —NH—C₂H₄OH | 10' / 120' | 65–70 / 75–80 | } Do. |

*Example 2*

20 parts of 4:4'-bis[2-anilino-4-ethylamino-1:3:5-triazyl-(6)]-tolidine of the formula

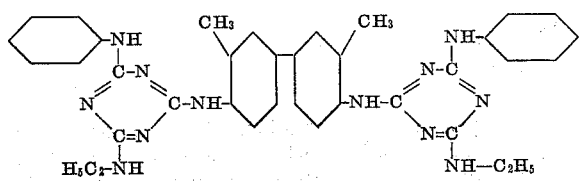

is introduced in small portions, while stirring well and cooling, into 190 parts of oleum (24 per cent. SO₃) in such manner that the temperature does not rise above 30° C. The whole is stirred for one hour at 30° C., the temperature is then raised to 50–55° C. in the course of 30 minutes, and stirring is continued for a further hour at that temperature. After being cooled, the brown reaction mixture is poured on to 400 parts of ice, and then a further 200 parts of water are added to the resulting suspension, while stirring well. The suspension is cooled to 5° C., sharply filtered with suction, and the filter residue is suspended in 1000 parts of hot water. The dilute sodium carbonate solution is then rendered neutral, so that dissolution becomes complete. The resulting disodium salt of 3:7-bis-[2-sulfoanilino-4-ethylamino - 1:3:5 - triazyl - (6)] - diaminodimethyl - dibenzothiophene dioxide-(5) of the formula

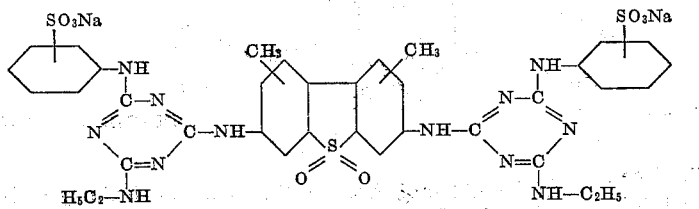

may be isolated from the aqueous solution by evaporation or salting out with sodium chloride. There is obtained a pale yellowish powder which dissolves in water. When the solution is poured on to white paper, the latter exhibits a bluish fluorescence when exposed to ultraviolet rays.

The 4:4'-bis-[2-anilino-4-ethylamino-1:3:5-triazyl-(6)]-tolidine used as starting material may be prepared as follows.

Into a solution of 18.8 parts of cyanuric chloride in 250 parts by volume of glacial acetic acid is poured at 30–35° C. while stirring strongly, a solution of 10.6 parts of ortho-tolidine in 150 parts by volume of glacial acetic acid. A further 8.2 parts of anhydrous sodium acetate are then added and the reaction mixture is stirred for 15 minutes at 35–40° C. In this manner there is obtained a beige white suspension, in which free amino groups can no longer be detected. There are then added 9.3 parts of aniline and 8.2 parts of anhydrous sodium acetate dissolved in 150 parts by volume of glacial acetic acid. The temperature is raised to 55–60° C. in the course of 30 minutes, and the reaction mixture is stirred at that temperature for 1–3 hours until free amino groups can no longer be detected. Finally 19.9 parts of an aqueous solution of 67.8 per cent. strength of monoethanolamine are added dropwise, the temperature is raised to 80–85° C., and the whole is stirred for 6 hours at that temperature. After being cooled to room temperature, the mixture is sharply filtered with suction, and the filter residue is washed first with ethanol and then with water, and dried. The resulting 4:4'-bis-[2-anilino-4-ethylamino-1:3:5-triazyl-(6)]-tolidine is a white powder.

In the following table are given further compounds which can be made in a similar manner:

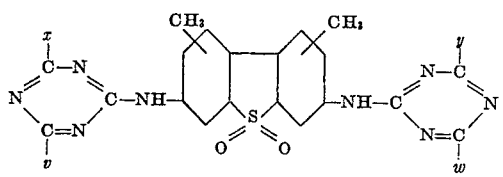

parts of water at 80–85° C. The mixture is then rendered neutral with dilute sodium carbonate solution, and, after stirring the mixture for 2–3 hours at 80–85° C., a homogeneous viscous mass is obtained. The resulting 3:7-bis-[2:4-diethylamino-1:3:5-triazyl-(6)]-diamino-dimethyl-dibenzothiophene dioxide-(5) of the formula

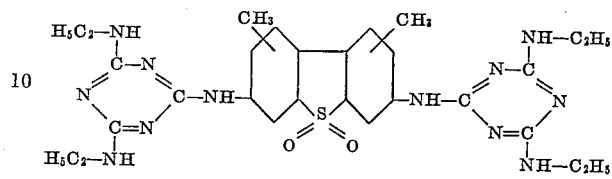

| x, y | v, w | Color or Fluorescence on paper |
|---|---|---|
| —NH—⬡—SO₃Na | —NH—C₂H₄—OH | greenish blue. |
| —NH—⬡—SO₃Na | —N(C₂H₅)₂ | Do. |
| —NH—⬡—SO₃Na | —NH—CH₂—CH₂—N(C₂H₅)₂ | Do. |
| —NH—⬡(SO₃Na)—CH₃ | —NH—C₂H₅ | Do. |
| —NH—⬡(SO₃Na)—CH₃ | —N(CH₂—CH₂)₂CH₂ (morpholine-like) | Do. |
| —NH—⬡(CH₃)(SO₃Na) | —N(C₂H₅)₂ | Do. |
| —NH—⬡(SO₃Na)—Cl | —NH—C₂H₅ | Do. |

*Example 3*

20 parts of 4:4'-bis-[2:4-diethylamino-1:3:5-triazyl-(6)]-tolidine of the formula

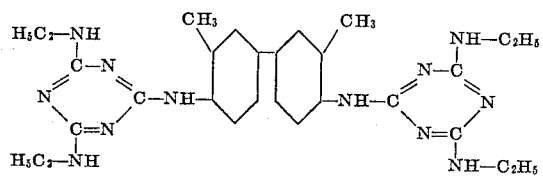

are introduced in small portions into 190 parts of oleum (24 per cent. SO₃), while stirring well and cooling, in such manner that the temperature does not exceed 30° C. The whole is stirred for one hour at 30° C., the temperature is then raised to 45–50° C. in the course of 15 minutes, and stirring is continued for a further 1½ hours at that temperature. After being cooled, the brown reaction mixture is poured on to 500 parts of ice, and mixed with 800 parts of water while stirring well. The resulting suspension is cooled to 5° C., sharply filtered with suction, and the filter residue is suspended in 1250 is best isolated by evaporation. There is obtained a bright yellowish powder which disperses colloidally in boiling water. After treating white paper with this dispersion, the paper exhibits a bluish fluorescence when subjected to ultraviolet rays.

The 4:4'-bis-[2:4-diethylamino-1:3:5-triazyl-(6)]-tolidine used as starting material can be prepared in a manner analogous to that of the 4:4'-bis-[2-anilino-4-ethylamino-1:3:5-triazyl-(6)]-tolidine described in Example 2, except that, instead of the aniline used in that example, an equivalent quantity of monoethylamine is caused to react.

In the same manner 3:7-bis-[2:4-di-(β-hydroxyethylamino)-1:3:5-triazyl-(6)]-diamino-dimethyl - dibenzthiophene-dioxide-(5) of the formula

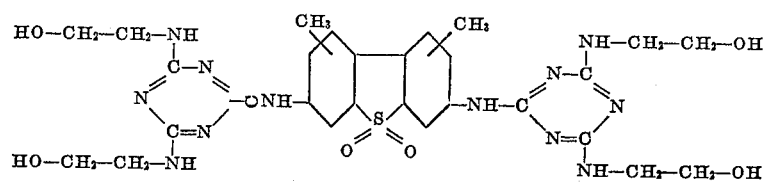

can be obtained from 4:4'-bis-[2:4-di-β-hydroxyethylamino)-1:3:5-triazyl-(6)]-tolidine or 3:7-bis-[2:4-di- (bis-β-hydroxyethylamino)-1:3:5-triazyl-(6)]-diamino-dimethyl-dibenzothiophene dioxide-(5) of the formula

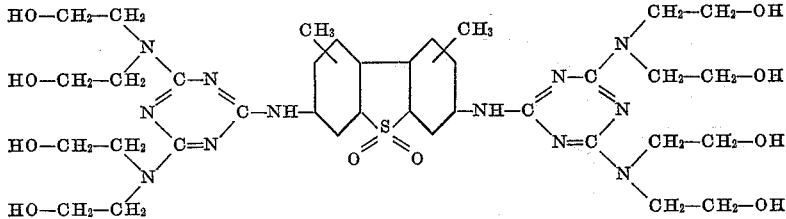 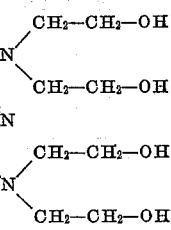

can be obtained from 4:4'-bis-[2:4-di-(bis-β-hydroxyethylamino)-1:3:5-triazyl-(6)]-tolidine. The product of the formula last given above dissolves clearly in hot water.

*Example 4*

A solution of 18.8 parts of cyanuric chloride in 150 parts by volume of glacial acetic acid is added at 60–65° C. to a suspension of 13.7 parts of finely ground tilidine sulfone in 250 parts by volume of glacial acetic acid. 8.2 parts of anhydrous sodium acetate are added to the suspension, and the reaction mixture is powerfully stirred for 20–30 minutes at 60–65° C. In this manner there is obtained a yellowish beige suspension, in which free amino groups can no longer be detected. 19.1 parts of very finely ground sulfanilic acid and 16.4 parts of anhydrous sodium acetate are then added and the temperature is raised, in the course of 2–2½ hours from 60–75° C., while stirring strongly. To the fine pale grey suspension there are added dropwise 19.9 parts of an aqueous solution of monoethylamine of 67.8 per cent. strength, the temperature is raised to 80–85° C., and the whole is stirred for 6 hours at that temperature. After being cooled to room temperature, the mixture is sharply filtered with suction, the filtered residue is washed with a little ethanol and water, and suspended in 1500 parts of hot water. The mixture is rendered neutral with a dilute solution of sodium carbonate, whereupon dissolution becomes complete. The resulting disodium salt of 3:7-bis-[2-para-sulfoanilino-4-ethylamino-1:3:5-triazyl-(6)]-diamino-dimethyl-dibenzothiophene dioxide-(5) of the formula

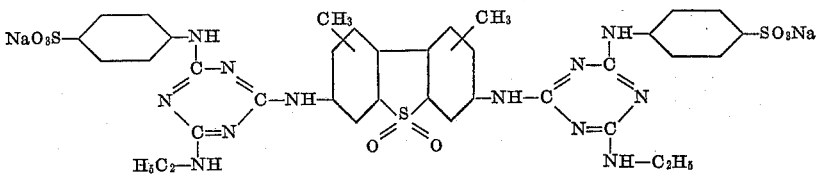 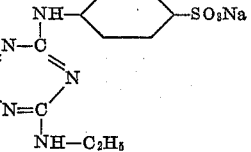

can be isolated from the aqueous solution by evaporation or salting out with sodium chloride. There is obtained a bright powder, which dissolves in water. When a solution thereof is poured on to white paper, the latter exhibits a bluish fluorescence when subjected to ultra-violet rays.

By using, instead of the sulfanilic acid mentioned above, an equimolecular quantity of metanilic acid, there is obtained a product having similar properties.

*Example 5*

Undyed cotton yarn is treated at a goods-to-liquor ratio of 1:30 for about ¼ hour at room temperature in a bath which contains, per liter, 0.04 gram of a condensation product obtained as described in Example 2. After rinsing and drying the material, it has a higher content of white than the same untreated yarn.

*Example 6*

The disodium salt of heptadecyl-N-benzyl-benzimidazyl-disulfonic acid is mixed with 0.05–0.5 per cent. of a condensation product obtained as described in Example 2 or 4. Undyed textile goods, which have been washed in the usual manner with the solution so prepared, exhibited a brighter appearance than textile goods which have been washed with the aforesaid sodium salt alone.

*Example 7*

Undyed cotton yarn is treated at a liquor ratio of 1:30 for about ¼ to ½ hour at room temperature in a bath, which contains, per liter, 0.02 gram of the condensation product obtained as described in the first paragraph of Example 1, and 0.02 gram of the disodium salt of 4:4'-bis-phenyl-ureido-stilbene-disulfonic acid-(2:2'). After being rinsed and dried, the yarn so treated has a more neutral white content than yarn which has been treated with a solution containing per liter 0.04 gram of the disodium salt of 4:4'-bis-phenylureido-stilbene disulfonic acid-(2:2').

*Example 8*

Undyed, bleached Orlon yarn is treated at a liquor ratio of 1:30 for ½ hour at 90° C. in a bath which contains, per liter, 1.5 grams of formic acid and 0.12 gram of the condensation product obtained as described in the first paragraph of Example 1. After being rinsed and dried the Orlon yarn so treated has a higher white content than the corresponding untreated material.

*Example 9*

Wool is treated at a liquor ratio of 1:30 for ½ hour in a bath having a temperature of 50° C. which contains in solution, per liter, 0.3 gram of a condensation product obtained as described in Example 2 and 1.5 grams of formic acid. The material is then rinsed and dried. The treated wool has a higher white content than the untreated wool.

*Example 10*

6.15 parts of benzidine are dissolved in 150 parts of hot water while adding 10 parts of concentrated hydrochloric acid, and diluted hot with 200 parts by volume of acetone. Before crystallization begins, the solution is added within 5 minutes to a suspension prepared by stirring 9.5 parts of cyanuric chloride dissolved in 50 parts of acetone in a mixture consisting of 100 parts of water and 200 parts of ice. By the further addition of ice, the temperature is kept between 0–5° C. A sodium carbonate solution of 10 per cent. strength is then added dropwise within 2 hours at a temperature of about 5° C. while stirring well, so that the reaction mixture only shows a weakly acid reaction. After that the weakly greenish colored suspension contains no more free amino groups. 4.7 parts of phenol dissolved in 20 parts by volume of acetone are then added, the temperature increased to 40° C. within an hour, and the whole stirred for 4 hours at 40–45° C., the resulting hydrochloric acid being neutralized by adding 50 parts of 1n-sodium hydroxide solution dropwise during the whole time. A solution of 17.3 parts of sulfanilic acid in 200 parts of water neutralized with dilute sodium carbonate solution is then added, the temperature raised within 1–2 hours to 60° C., and the whole stirred for 15–18 hours at 60–65° C. The resulting condensation product of the formula

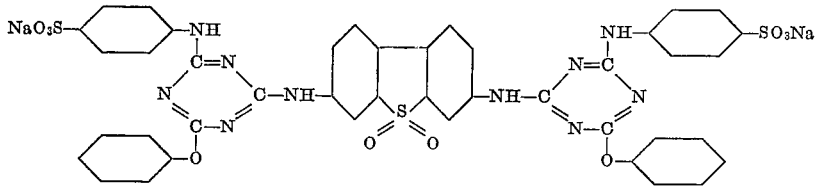

is separated off by adding sodium chloride and a little alcohol, filtered, washed with sodium chloride solution until the sulfanilic acid used in excess has evolved, and dried. The new product is a greenish powder readily soluble in hot water. When the solution is poured on to white paper it exhibits a greenish blue fluorescence when exposed to ultra-violet rays.

If the phenol in the above example is replaced by an equimolecular quantity of thiophenol, a product having similar properties is obtained.

What is claimed is:

1. A colorless to substantially colorless derivative of dibenzothiophene dioxide of the general formula

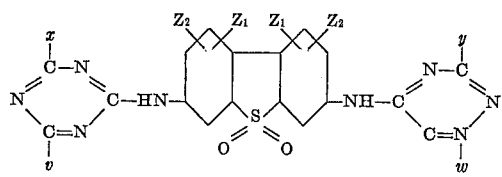

in which $x$ and $y$ each represent a radical containing at the most 18 carbon atoms, said radical being selected from the group consisting of —$NH_2$, radicals of primary amines and radicals of secondary amines, of which radicals the nitrogen atom is bound to the triazine ring, $v$ and $w$ each represent a substituent selected from the group consisting of halogen atoms, hydroxyl groups and radicals of the kind represented by $x$ and $y$, and $Z_1$ and $Z_2$ each represent a radical selected from the group consisting of hydrogen, halogen, methyl, methoxy and sulfonic acid groups.

2. A colorless to substantially colorless derivative of the dibenzothiophene dioxide of the general formula

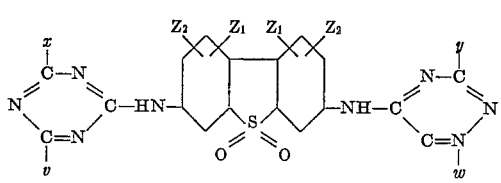

in which $v$, $w$, $x$ and $y$ each represent a radical of an at most secondary amine containing at the most 18 carbon atoms, of which radicals the nitrogen atom is bound to the triazine ring and $Z_1$ and $Z_2$ each represent a radical selected from the group consisting of hydrogen, halogen, methyl, methoxy and sulfonic acid groups.

3. A derivative of the dibenzothiophene dioxide of the general formula

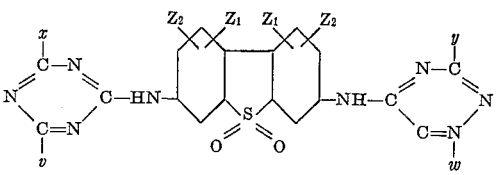

in which $v$, $w$, $x$ and $y$ each represent the radical of an aliphatic amine containing at the most 4 carbon atoms, $Z_1$ represents a hydrogen atom, and $Z_2$ represents an alkyl group.

4. 3:7-bis-[2:4-diethylamino-1:3:5 - triazyl-(6)]-diamino-dimethyldibenzothiophene dioxide-(5) of the formula

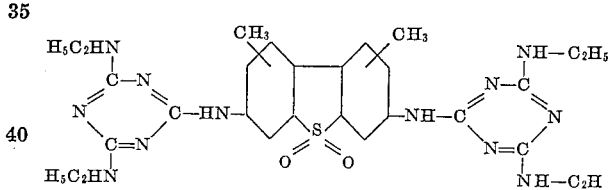

5. A water soluble derivative of the dibenzothiophene dioxide of the general formula

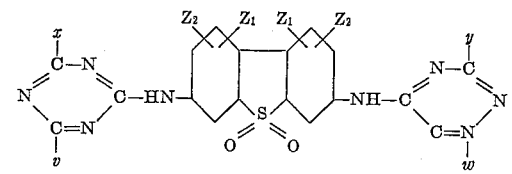

in which $v$ and $w$ each represent the radical of a mononuclear aromatic amine containing a sulfuric acid group, $x$ and $y$ each represent the radical of a non-aromatic amine, and $Z_1$ represents a hydrogen atom, and $Z_2$ represents a methyl group.

6. The disodium salt of 3:7-bis-[2-sulphanilino-4-ethylamino-1:3:5-triazyl-(6)]-diamino - dimethyldibenzothiophene-dioxide-(5) of the formula

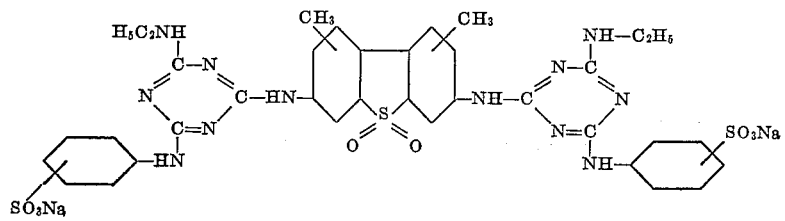

7. The disodium salt of 1:9-disulpho-3:7-bis-[2:4-diethylamino - 1:3:5 - triazyl - (6)] - diaminodibenzothiophene-dioxide-(5) of the formula

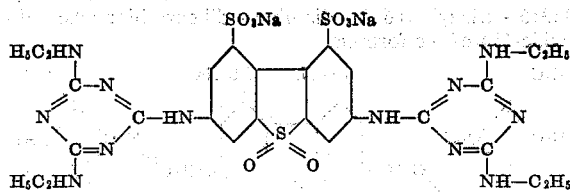

8. The disodium salt of 1:9-disulpho-3:7-bis-[2:4-di(dimethylamino) - 1:3:5-triazyl - (6)] - diamino-dibenzothiophene-dioxide-(5) of the formula

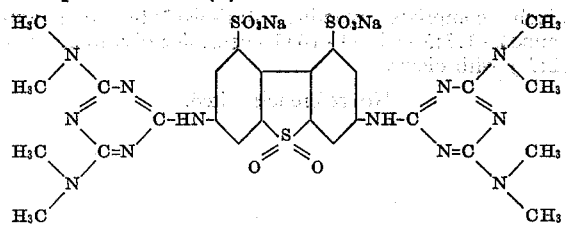

9. A process for the manufacture of a colorless to substantially colorless dibenzothiophene dioxide of the general formula

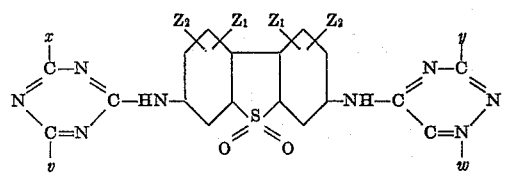

in which $v$, $w$, $x$ and $y$ each represent a radical containing at the most 18 carbon atoms, said radical being selected from the group consisting of —$NH_2$, radicals of primary amines, radicals of secondary amines, of which radicals the nitrogen atom is bound to the triazine ring and $Z_1$ and $Z_2$ each represent a radical selected from the group consisting of hydrogen, halogen, methyl, methoxy and sulfonic acid groups, which comprises reacting a derivative of benzidine of the general formula

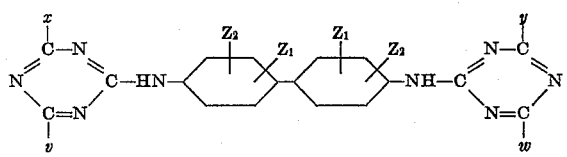

wherein $v$, $w$, $x$, $y$, $Z_1$ and $Z_2$ have the meanings given above, with an agent yielding sulfur trioxide.

10. A process for the manufacture of a derivative of the dibenzothiophene dioxide of the general formula

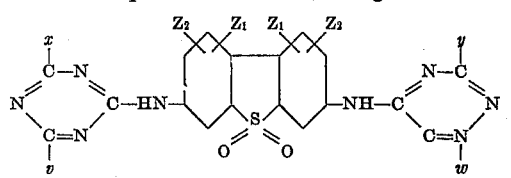

in which $v$, $w$, $x$ and $y$ each represent the radical of an aliphatic amine containing at the most 4 carbon atoms, $Z_1$ represents a hydrogen atom, and $Z_2$ represents a methyl group, which comprises reacting a derivative of benzidine of the general formula

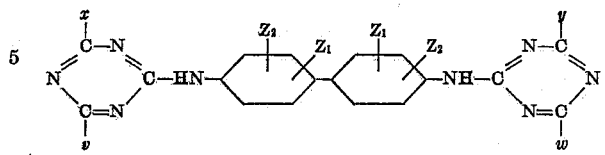

wherein $v$, $w$, $x$, $y$, $Z_1$ and $Z_2$ have the meanings given above with oleum.

11. A process for the manufacture of 3:7-bis[2:4-diethylamino - 1:3:5 - triazyl - (6)] - diamino-dimethyl-dibenzothiophene dioxide - (5) of the formula

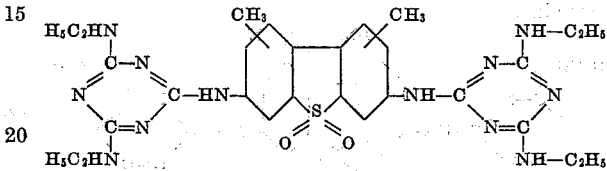

which comprises reacting 4:4'-bis-[2:4-diethylamino-1:3:5-triazyl-(6)]-tolidine with oleum.

12. A process for the manufacture of a water soluble derivative of the dibenzothiophene dioxide of the general formula

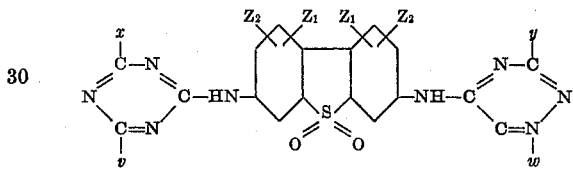

in which $v$ and $w$ each represent the radical of a mono nuclear aromatic amine containing a sulfonic acid group, $x$ and $y$ each represent the radical of an aliphatic amine containing at the most 4 carbon atoms, and $Z_1$ represents a hydrogen atom, and $Z_2$ represents a methyl group, which comprises reacting a derivative of benzidine of the general formula

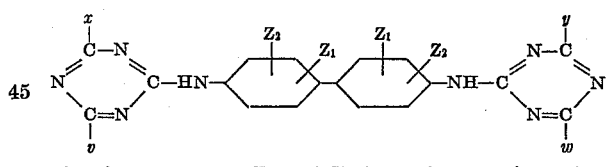

wherein $v$, $w$, $x$, $y$, $Z_1$ and $Z_2$ have the meanings given above, with oleum.

13. A process for the manufacture of the disodium salt of 3:7-bis-[2-sulphanilino-4-ethylamino-1:3:5-triazyl-(6)]-diamino-dimethyldibenzo-thiophene-dioxide-(5) of the general formula

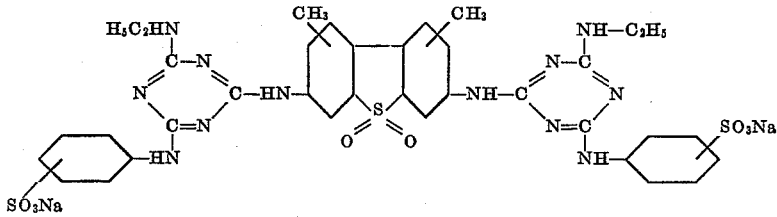

which comprises reacting 4:4'-bis-[2-anilino-4-ethylamino-1:3:5-triazyl-(6)]-tolidine with oleum.

14. A process for the manufacture of a water soluble derivative of the dibenzothiophene dioxide of the general formula

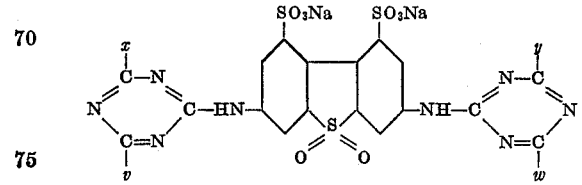

in which $v$, $w$, $x$ and $y$ represent radical of an aliphatic amine containing at the most 4 carbon atoms, which comprises reacting a derivative of the general formula

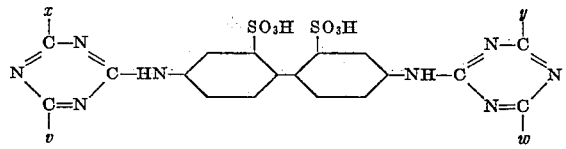

wherein $v$, $w$, $x$ and $y$ have the meanings given above, with oleum.

15. A process for the manufacture of the disodium salt of 1:9-disulpho-3:7-bis-[2:4-diethylamino-1:3:5-triazyl-(6)]-diaminodibenzo-thiophene-dioxide-(5) of the formula

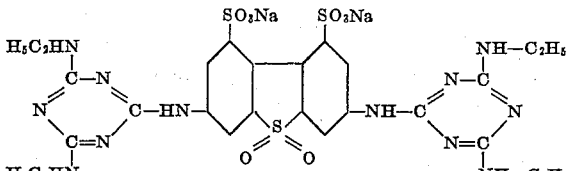

which comprises reacting 4:4'-bis-[2:4-diethylamino-1:3:5-triazyl-(6)]-benzidine-disulfouic acid (2:2') with oleum.

16. A process for the manufacture of the disodium salt of 1:9-disulpho-3:7-bis-[2:4-di-(dimethylamino)-1:3:5 - triazyl - (6)] - diamino - dibenzothiophene - dioxide-(5) of the formula

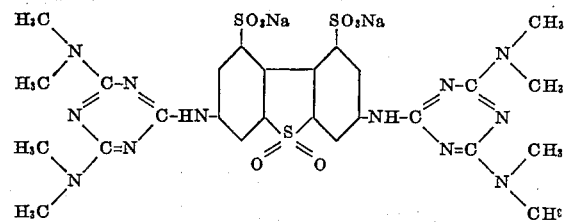

which comprises reacting 4:4'-bis[2:4-di-(dimethylamino) - 1:3:5 - triazyl - (6)] - benzidine disulfonic acid-(2:2') with oleum.

No references cited.